(No Model.)

A. F. MADDEN.
PLATE FOR SECONDARY BATTERIES.

No. 457,880. Patented Aug. 18, 1891.

ON LINE 2—2

Attest
Baltus DeLong
Sidney P. Hollingsworth

Inventor
ALBERT F. MADDEN
by his attorneys
Baldwin, Davidson & Wight

THE NORRIS PETERS CO., PHOTO-LITHO., WASHINGTON, D. C.

UNITED STATES PATENT OFFICE.

ALBERT FRANKLIN MADDEN, OF NEWARK, NEW JERSEY, ASSIGNOR TO JOHN M. PENDLETON, OF NEW BRIGHTON, NEW YORK.

PLATE FOR SECONDARY BATTERIES.

SPECIFICATION forming part of Letters Patent No. 457,880, dated August 18, 1891.

Application filed January 2, 1891. Serial No. 376,496. (No model.)

*To all whom it may concern:*

Be it known that I, ALBERT FRANKLIN MADDEN, a citizen of the United States, residing at Newark, Essex county, New Jersey, have invented certain new and useful Improvements in Plates or Elements for Electrical Accumulators, of which the following is a specification.

The object of the invention is twofold—first, to insure a proper and uniform bracing, spacing, and separation of the plates of an accumulator-cell or secondary battery, and, second, to afford means for supporting the plates on the bottom of the cell and securing the pile or assemblage of plates firmly together. The first purpose has usually heretofore been accomplished by placing spacing-strips of insulating material between the plates or by attaching to the plates india-rubber bands or elastic lugs. In my improved plate the separating-plugs are molded from plastic insulating material on and in the body of the plate. As this is to be done by machinery and all the plugs of a single plate are formed or molded thereon at a single operation, absolute uniformity is obtained and perfectly equal separation and spacing of the plates is insured.

Figure 1:
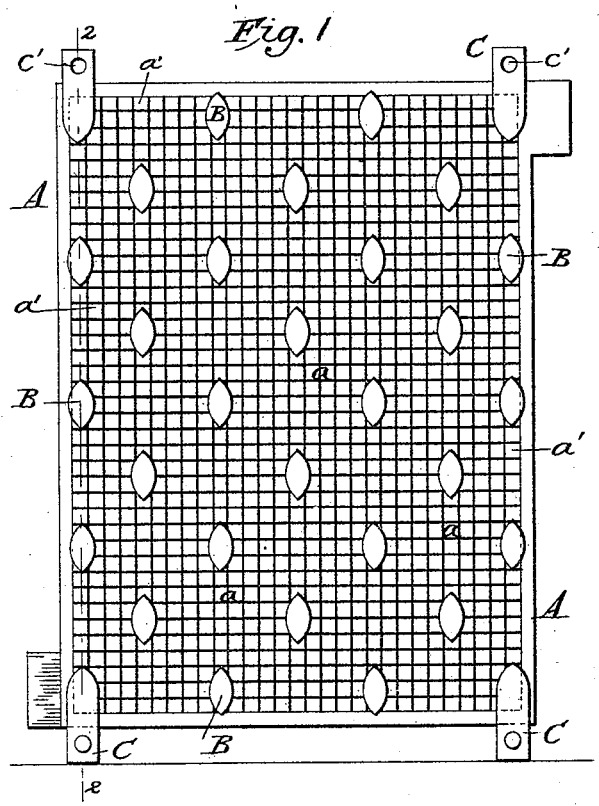
Figure 2:
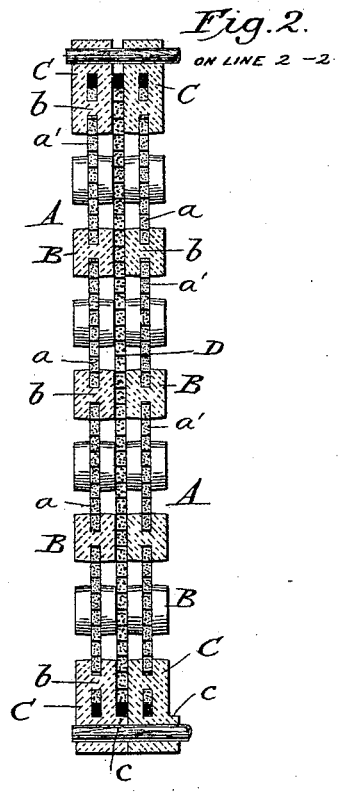
Figure 3:
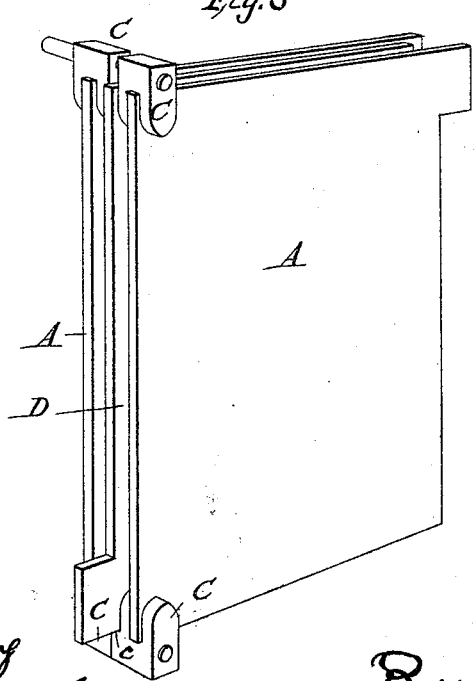

In the accompanying drawings, Figure 1 is a side elevation of an accumulator-plate made according to my invention; Fig. 2, a section through two negative and an interposed positive plate; and Fig. 3 a view showing three plates, with the middle or positive plate arranged with its tag or terminal at the bottom.

The grid A is of ordinary cellular structure and may be made of lead or lead alloy, as usual. The cells $a$ are shown filled with active material $a'$ in the ordinary manner.

My improved plate may be made as follows: The plate containing the active material is placed in a suitable die, and multiple apertures are punched therein for the reception of the material forming the plugs. Multiple charges of plastic insulating material are then forced into the apertures in such a manner as to penetrate into the die and through the plate and be molded on each side thereof to form plugs on each side identical in thickness or size. These plugs are indicated by B, and in the sectional view it will be seen that they are connected by reduced portions $b$, that pass through the plate. At the bottom edge of the plate two or more of the plugs are enlarged and brought down beyond the margin of the metal plate to form feet, upon which the plate stands on the bottom of the jar or cell. On one side the feet are thicker than on the other, thus forming offsets, ledges, or seats $c$, upon which the lower edge of the positive plate D rests. These feet and the plugs are all formed or molded at a single operation in a die of any suitable construction.

A suitable machine for making this improved plate is shown in my application, Serial No. 344,134, filed March 17, 1890.

The material of which the plugs are formed may be a mixture of shellac or neutral or inert resistance material—such, for instance, as common clay, dried and ground to powder—or any suitable material or mixture may be used that is adapted to the formation of the plugs and is of such a character as not to disintegrate in the battery-fluid.

I have shown a number of plugs arranged in rows across the surface of the plate. The faces of the plugs are preferably flattened, as shown, and when the plates are arranged side by side in a cell the plugs are in lines transverse to the plates and thoroughly brace all the plates and preserve their absolutely-uniform separation. This is a result practically impossible to attain with the ordinary means of spacing above referred to. When these plates are secured together to be placed in a jar or cell, they form a compact body, each plate of which is firmly held in exact and proper position with reference to the other plates in the cell.

The plates may be secured together by a pin or plug running through the apertures $c'$ in each line or row of feet or projections C; or, after the plates are assembled, a hot searing-iron may be applied to the edges of the projections, thus melting the material, causing all the projections to unite at their edges in a solid mass. The result is that the pile is a solid self-supporting set of electrodes, capable of shipment in this condition. In this connection I prefer also to form one or more projections C at the upper edge of each negative plate, so that the pile may be firmly secured or welded together at the top as well as the bottom. With this construction the group of positive plates may be reversed with reference to the group of negative plates—i. e., the terminal of the negative group may be at the top of the pile, while the terminal of the positive group may be at the bottom and be led out by a suitable insulated conductor, or vice versa, as is common.

I contemplate providing the negative plates only with separator-plugs that project on each side. If, however, the plugs are so formed as to project on one side only, both the positive and negative plates could be provided with them.

I claim as my invention—

1. An element or plate for an accumulator-cell having separator-plugs molded therein with a shank extending through the plate and heads on each side of the plate integral with the shank.

2. An element or plate for an accumulator-cell having molded thereon supporting-feet of insulating material, said feet being formed by a shank extending through the plate and portions exterior to the plate and integral with the shank.

3. An element or plate for an accumulator-cell having molded thereon supporting-feet of insulating material formed with offsets or seats for the lower edge of an adjoining plate.

4. An element or plate for an accumulator-cell having molded thereon separator-plugs with shanks extending through the plate and heads on each side of the plate integral with the shanks, and supporting-feet of insulating material.

5. An element or plate for an accumulator-cell having molded or formed thereon projections of insulating material extending beyond the edge of the plate, and by means of which the plates of the pile are secured together, substantially as described.

In testimony whereof I have hereunto subscribed my name.

ALBERT FRANKLIN MADDEN.

Witnesses:
FRANK S. OBER,
MAMIE J. KELLEY.